March 20, 1956　　　A. H. RICE　　　2,738,580
LAWN WEED DIGGER

Filed Feb. 4, 1953　　　2 Sheets-Sheet 1

INVENTOR.
ALBA H. RICE
(DECEASED)
BY
Jerome R. Cox
ATTORNEY

March 20, 1956  A. H. RICE  2,738,580
LAWN WEED DIGGER

Filed Feb. 4, 1953  2 Sheets-Sheet 2

INVENTOR.
ALBA H. RICE
(DECEASED)
BY
Jerome R. Cox
ATTORNEY ns by the operator. Upon release of pressure, the spring means 31, 35 and 36 return the shaft to its extended posi-

United States Patent Office 2,738,580
Patented Mar. 20, 1956

2,738,580
LAWN WEED DIGGER

Alba H. Rice, deceased, late of Mansfield, Ohio, by Byron C. Rice, administrator, Mansfield, Ohio, assignor to Dellos A. Rice, Mansfield, Ohio Application February 4, 1953, Serial No. 335,082

6 Claims. (Cl. 30—276)

The invention disclosed in this application relates in general to gardening tools and most specifically to a garden tool implement which is designed to remove weeds and other undesired plants from gardens and lawns.

Prior hereto, many attempts have been made to design similar implements. For example, implements have been proposed which were intended to cut off such plants by a manual turning force exerted as a turning force by the operator, either directly or through a crank operation. Some of such devices were intended to operate above the ground and some were intended to operate below the ground. Other devices have utilized the principle of the worm (i. e. means for converting downward force into rotating movement) for rotating a cutter blade. However, wherever such a principle has been utilized, the designer has appeared to think that such devices are only adapted to cut plants above the ground. No one prior to me has apparently thought of utilizing downward force to move the point of the implement into ground directly and also through the worm principle not only to cause the rotation of the cutters, but also to utilize the same principle to rotate a screw to cause the cutter to be moved into the ground as an auger is moved and to cut the plants off below the surface of the ground.

One of the objects of the invention is therefore the provision of an improved cutting device of the character described.

One of the further objects of my invention is to provide a device of the type described which has rotating cutters operating below the surface of the ground whereby not only is the upper part of the weed removed but also the roots are taken from the ground.

A further object is the provision of a device which will cut the roots of a weed or other type of plane below the surface of the ground by a rotating propeller type blade forced into the ground by direct force and by a screw, thus accomplishing the easy and efficient removal of the plant.

A further object is to provide a device of the character described which requires only a downward pressure to be exerted in order to force the cutters below and to actuate the cutters below the surface of the ground.

A further object of my invention is the provision in such a device of means for rotating the cutter blades.

A further object of the invention is the provision in such a device of means for converting a downward force into rotary motion for rotating the cutter blades and/or rotating an auger bit like extension to bore into the earth and thus position the cutters below the surface.

Further objects, features and advantages of the invention will be apparent from a consideration of the detailed description which follows, of the accompanying drawings, and of the appended claims.

In the drawings:

Referring to the drawings which illustrate an embodiment of the invention, it may be seen that therein:

Figure 1:
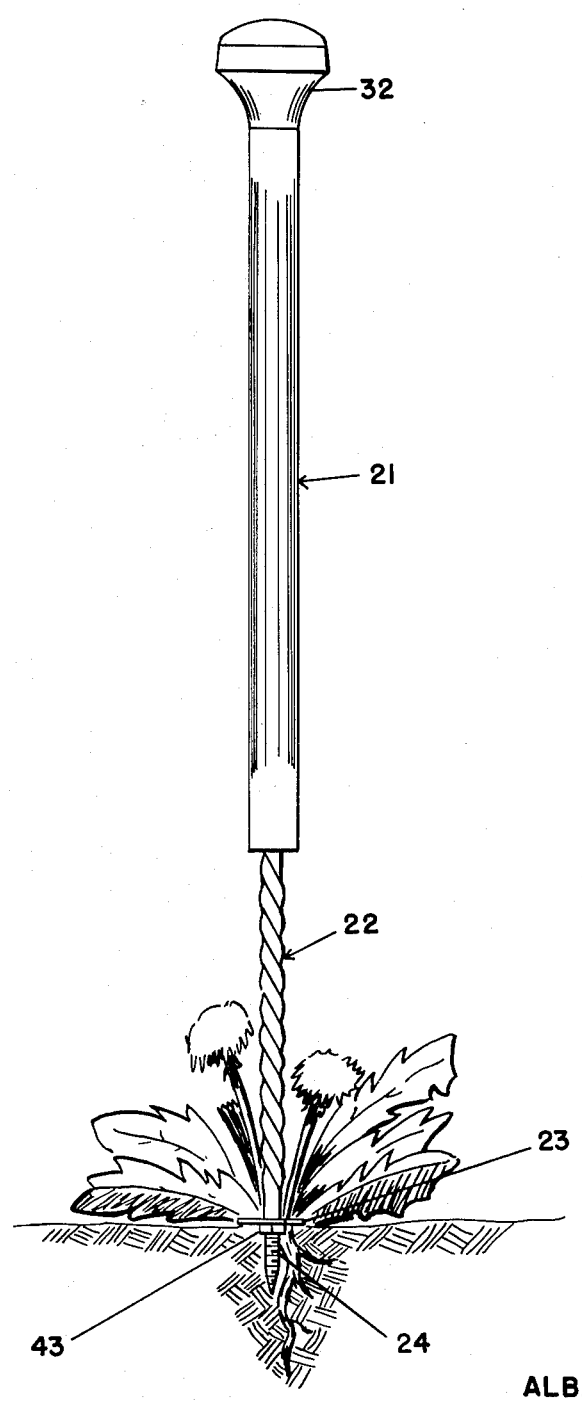
Fig. 1 is a view in perspective showing the implement ready for use.
Figure 2:
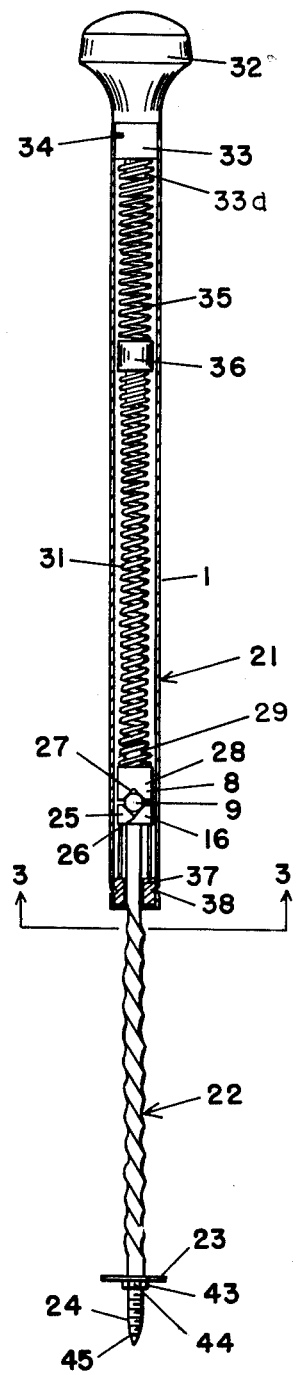
Fig. 2 is a view in vertical section of the implement of Fig. 1.
Figure 4:
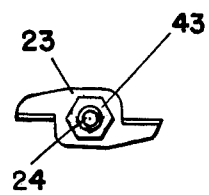
Fig. 4 is a plan view of the cutter blades removed from the shaft.

Referring to the drawings for a detailed description, it may be seen that the implement is composed of a cylindrical tube or housing generally designated 21, a rotatable shaft generally designated 22, cutter blades generally designated 23 and an auger point or screw designated 24. The upper end of the shaft is resiliently supported in the housing 21 as will be more fully described below and means are provided for converting a vertical force exerted on the housing 21 into rotary movement of the blades 23 and of the auger point 24 in order that the point may bore into the ground carrying the cutting blades with it and that the blades may be rotated to perform their cutting function.

The shaft 22 is mounted resiliently in the housing 21 and may be reciprocated therein in order that it may be rotated to operate the auger point 24 and blades 23. The housing 21 is a hollow tube or cylinder and the upper end of the shaft 22 has a cylindrical enlargement 25 fitting fairly closely within the cylinder but sliding easily therein. The enlargement 25 is provided with a hemispherical socket 26 in which there is positioned a ball bearing 27. The upper end of the ball bearing 27 fits in a similar hemispherical socket in a guide lug or abutment member 28 which is also cylindrical and also slides easily in the cylinder 21. Bearing on the upper end of the member 28 and positioned by a concentric reduced extension 29 of said member 28 is a compression spring 31 which also fits fairly closely but loosely in the cylinder 21.

Closing the upper end of the cylinder 21 is a handle 32 by which the implement is carried and operated. The handle 32 has a reduced lower end portion 33 which fits in the upper end of the cylinder 21 and is there secured as by screws 34. The portion 33 itself has a reduced extension 33a and surrounding this extension 33a and extending downward therefrom is another spring 35 which at its lower end bears on a floating abutment 36 interposed between the spring 35 and the spring 31. The springs 31 and 35 and the abutment 36 are thus resilient means bearing on the abutment 28 and the upper end of the shaft 22 to urge the shaft 22 normally downward relative to the housing and out of the housing and to urge the housing upward. The lower end of the cylinder 21 is closed by a plug 37 held in place by screws 38 which plug will be described more completely below.

Figure 3:
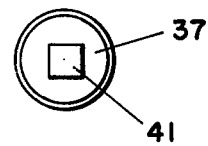
Fig. 3 is a view in bottom plan of the device looking upward in the direction of the arrows 3—3 of Fig. 2 with the threaded shaft however omitted.

The means for converting vertical force into rotary motion will now be described. The plug 37 is formed as is shown most clearly in Fig. 3 with a slot 41 which may, if desired, be substantially square as shown and the shaft 22 is provided with worm threads whereby movement of the shaft 22 through the slot forces the shaft 22 to rotate about its longitudinal axis rotating the auger point 24 and the blades 23. The blades 23 are held on the reduced end of the shaft 22 by a nut 43 screwed on to threads 44 which form a continuation of the auger threads 45.

The operation is fairly obvious. The operator places the point 24 over the weed and presses downward on the handle 32. This downward force urges the point 24 downward and causes the auger point to dig in, carrying the blades 23 with it. This downward force also causes the blades to revolve, cutting the weed and its roots and destroying the weed. Upon release of pressure, the spring means 31, 35 and 36 return the shaft to its extended position (i. e., raise the housing), so that the implement is ready for another operation.

It is to be understood that the above embodiment of my invention is for the purpose of illustration only and various changes may be made therein without departing from the spirit and scope of my invention.

I claim:

1. A garden implement consisting of a rotatable shaft having it lower end formed as a screw and having a cutting blade secured adjacent to said lower end; a housing receiving said shaft; means comprising a spring cooperating with said housing and said shaft to move said shaft relative to said housing, so that said spring urges said shaft from said housing; a handle secured to and carried by said housing; and means for converting downward force exerted on said handle into rotating movement of said screw and blade, said means comprising a slotted plug closing the lower end of said housing and a worm thread on said shaft.

2. A garden implement consisting of a rotatable shaft having its lower end formed as an auger and having a cutting blade secured adjacent to said lower end; a cylindrical housing receiving said shaft; a handle secured to and carried by said housing; a guide plug in said housing; a universal joint by which said shaft is connected to said guide plug; and means for converting downward force exerted on said handle into rotating movement of said auger and blade, said means comprising a slotted plug closing the lower end of said housing and a worm thread on said shaft, whereby said handle and said housing move together axially and rotatably relative to the shaft when said pressure is applied.

3. A garden implement consisting of a rotatable shaft having its lower end formed as an auger, having a shoulder just above said auger portion, and having a cutting blade secured adjacent to said lower end; a nut secured on said shaft above said auger portion and securing said cutting blade against said shoulder; a cylindrical housing receiving said shaft; a handle secured to and carried by said housing; and means for converting downward force exerted on said handle into rotating movement of said auger and blade. said means comprising a slotted plug closing the lower end of said housing and a worm thread on said shaft.

4. A garden implement consisting of a rotatable shaft having its lower end formed as a screw and having a cutting blade secured adjacent to said lower end, a housing receiving said shaft; a handle for said housing closing the upper end thereof, means comprising a pair of springs positioned in said housing, bearing at one end on said shaft and at the other end on said handle and urging said handle upward relative to said shaft so that said shaft is urged out of said housing, a floating abutment being interposed between said pair of said springs; and means for converting downward force exerted on said handle into rotating movement of said screw and blade, said means comprising a slotted plug closing the lower end of said housing and a worm thread on said shaft.

5. A garden implement consisting of a rotatable shaft having its lower end formed as a screw and having a cutting blade secured adjacent to said lower end, a housing receiving said shaft; a handle secured to said housing for movement therewith, and means for converting downward force exerted on said handle into rotating movement of said screw and blade, said means comprising a plug with a square slot closing the lower end of said housing and a worm thread on said shaft extending through said square slot.

6. An agricultural instrument consisting of a hollow cylinder; a handle secured to and closing one end of said cylinder; a compression spring contained within said cylinder and having one end bearing against said handle; a rotatable shaft, having its upper end slidably received in said cylinder so that the end of said spring opposite to the end bearing against said handle bears against said upper end of said shaft and urges said shaft from said cylinder, and having its lower end formed with a worm thread; a slotted plug, slidably engaging said shaft, closing the lower end of said cylinder and preventing the upper end of said shaft from leaving said cylinder; means including said plug and worm thread for rotating said shaft about its longitudinal axis as it is slidably moved within said housing; and a cutting blade secured to said shaft for rotation therewith and spaced from the lower end of said shaft adjacent to the worm thread; whereby the rod will rotate about its longitudinal axis when it is forced into the housing, against the restraining force of the spring, by exertion of downward pressure on the handle causing the lower end of the shaft to enter into the ground as a direct result of said pressure and because of the rotation of said worm and also causing said blade attached thereto to be rotated for the purpose of cutting plants below the surface of the ground.

References Cited in the file of this patent

UNITED STATES PATENTS

| | | |
|---|---|---|
| 787,488 | Yowman | Apr. 18, 1905 |
| 805,179 | Zastrow | Nov. 21, 1905 |
| 843,399 | King | Feb. 5, 1907 |
| 1,842,903 | Falk | Jan. 26, 1932 |